US008862611B2

(12) United States Patent
Bose et al.

(10) Patent No.: US 8,862,611 B2
(45) Date of Patent: Oct. 14, 2014

(54) BOTTOM-UP QUERY PROCESSING SCHEME FOR XML TWIGS WITH ARBITRARY BOOLEAN PREDICATES

(75) Inventors: Sumit Kumar Bose, Delhi (IN); Rashi Malviya, Allahabad (IN)

(73) Assignee: Infosys Limited, Bangalore (IN)

( * ) Notice: Subject to any disclaimer, the term of this patent is extended or adjusted under 35 U.S.C. 154(b) by 308 days.

(21) Appl. No.: 13/170,937

(22) Filed: Jun. 28, 2011

(65) Prior Publication Data

US 2013/0007038 A1  Jan. 3, 2013

(51) Int. Cl.
*G06F 17/30* (2006.01)

(52) U.S. Cl.
CPC ............................... *G06F 17/30938* (2013.01)
USPC ......................................................... 707/769

(58) Field of Classification Search
None
See application file for complete search history.

(56) References Cited

U.S. PATENT DOCUMENTS

| 8,285,711 | B2 * | 10/2012 | Bordawekar et al. | 707/718 |
| 2003/0195881 | A1 * | 10/2003 | Koo et al. | 707/5 |
| 2008/0154860 | A1 * | 6/2008 | Chen et al. | 707/3 |
| 2008/0270371 | A1 * | 10/2008 | Fiebig | 707/4 |
| 2009/0150339 | A1 * | 6/2009 | Bruno et al. | 707/2 |
| 2009/0164424 | A1 * | 6/2009 | Sznajder et al. | 707/3 |

OTHER PUBLICATIONS

Zhang, Chun et al., On Supporting Containment Queries in Relational Database Management Systems, ACM Sigmod, May 21-24, 2011, Santa Barbara, California, USA.

W3C XML Query (XQuery), http://www.w3.org/XML/Query.
XMLData Repository, http://www.cs.washington.edu/research/xmldatasets/.
Yu, Tian et al., TwigStackList: A Holistic Twig Join Algorithm for Twig Query with Not-predicates on XML Data, School of Computing, National University of Singapore.
Jiang, Haifeng, Efficient Processing of XML Twig Queries with OR-Predicates, SIGMOD Jun. 13-18, 2004, Paris, France.
Jiao, Enhua et al., A Holistic Path Join Algorithm for Path Query with Not-predicates on XML Data, School of Computing, National University of Singapore.
Bruno, Nicolas et al., Holistic Twig Joins: Optimal XML Pattern Matching, ACM SIGMOD Jun. 4-6, 2002, Madison, Wisconsin, USA.
Chen, Songting et al., Twig2Stack: Bottom-up Processing of Generalized-Tree-Pattern Queries over XML Documents, VLDB Sep. 12-15, 2006, Seoul, Korea.

(Continued)

*Primary Examiner* — Jacob F Bétit
*Assistant Examiner* — Kelley Buckingham
(74) *Attorney, Agent, or Firm* — Marc S. Kaufman; Stephen M. Hertzler; Reed Smith LLP

(57) ABSTRACT

Systems, methods, and computer-readable code for processing queries for XML twigs using bottom-up processing include: receiving, by a computing device, a query XML twig including at least one sub-twig; determining whether an element in an XML tree is a root element of at least one sub-twig of the query XML twig, evaluating an arbitrary Boolean operation in the at least one sub-twig; populating a logic block if the element is a root element of the at least one sub-twig; inserting the element into an appropriate stack of a hierarchical stack if the element is not a root element of the at least one sub-twig; evaluating whether the element contributes to finding results of the query; discarding the element if the element does not contribute to finding results of the query; and determining whether the element is the root of the query XML twig.

11 Claims, 7 Drawing Sheets

(56) References Cited

OTHER PUBLICATIONS

Bose, Sumit Kumar et al., A Memory Efficient Bottom-up Query Processing Scheme for XML Twigs with 'Arbitrary' Boolean-Predicates, SETLabs, Infosys Technologies Limited, India.

Al-Khalifa, Shurug et al., Structural Joins: A Primitive for Efficient XML Query Pattern Matching.

* cited by examiner

BOTTOM-UP QUERY PROCESSING SCHEME FOR XML TWIGS WITH ARBITRARY BOOLEAN PREDICATES

BACKGROUND

Extensible Markup Language ("XML") has evolved into a standard for data representation and information exchange over the internet. XML data models generally model XML as a tree of element nodes ("elements"). Elements in an XML tree may be connected via parent-child edges or ancestor-descendent edges. As XML trees grow in size, the challenge of efficiently querying XML trees increases both in terms of efficiency and memory consumption.

A query expression specifying a pattern to be matched from the XML tree may be viewed as a tree-modeled substructure. Such tree-modeled substructures are typically referred to as XML twigs as the pattern they represent indicates a selection predicate over not only the data represented by the elements themselves, but also the structural relation of elements in the tree (i.e. the parent-child edges or ancestor-descendent edges of the tree). "Holistic" twig query processing techniques have been developed to minimize the intermediate root-to-leaf path matches that will not generate final XML twig results. Some "holistic" XML twig pattern matching schemes have been even suggested that can "holistically" match an XML twig including a specific Boolean predicate. In an attempt to reduce costly post-processing for redundant data and/or grouping of the matching results from intermediate path matches, "Twig$^2$Stack: Bottom-up Processing of Generalized-Tree-Pattern Queries over XML documents" by Chen et al., the contents of which are incorporated herein by reference, suggested a hierarchical stack encoding scheme to compactly represent twig results and a bottom-up algorithm for processing twig queries based on the encoding scheme.

However, current "holistic" schemes deal only with XML twig queries limited to having a single primary Boolean predicate. In other words, while one solution has been suggested that may match a query XML twig that includes an AND Boolean predicate and another solution has been suggested that may match a query XML twig that includes an OR Boolean predicate, no single solution exists that provides the flexibility to handle arbitrary Boolean predicates. Additionally, current XML twig query processing schemes continue to use large amounts of memory to store intermediate results.

While systems, methods, and computer-readable media are described herein by way of examples and embodiments, those skilled in the art recognize that bottom-up query processing schemes for XML twigs with arbitrary Boolean predicates are not limited to the embodiments or drawings described. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

As described in the background, existing systems for processing queries for XML twigs (i.e., matching an XML twig in an XML tree) are limited to processing XML twigs which may include a single primary Boolean predicate. Additionally, these existing solutions are memory intensive. Embodiments disclosed herein provide systems, computer-implemented methods, and computer-readable media for memory efficient query processing of XML twigs with arbitrary Boolean predicates. Arbitrary Boolean predicates may include primary Boolean predicates (i.e., AND, OR, and NOT), derived Boolean predicates (e.g., NAND, NOR, XOR, and XNOR), and combinations thereof.

Figure 1:
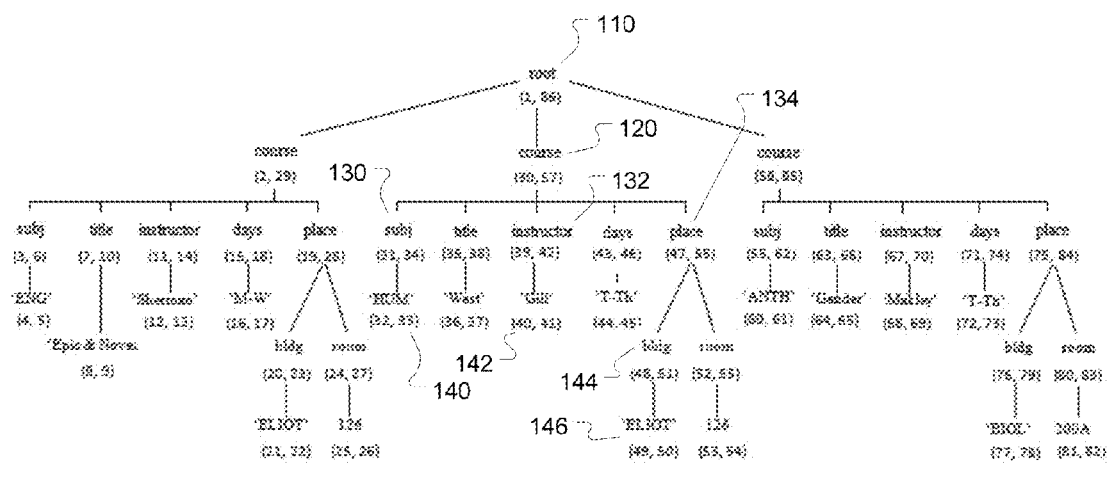
FIG. 1 shows an exemplary portion of an XML tree including start and end tags for each node.

FIG. 1 shows an exemplary portion of an XML tree 100 including start and end tags (i.e., startpos and endpos tags) for each node. Querying such an XML tree involves extracting a structural pattern, the XML twig, from the tree. In an XML tree or XML twig, nodes with parent-child relationships in such a tree are generally denoted with the symbol "/" whereas nodes with ancestor-descendant relationship are generally denoted using the symbol "//". For example, the following query looks for the titles of all courses of the subject Human Science ("HUM") offered by the instructor Gill.

$Q_1$: /root/course [instructor="Gill" AND subj="HUM"]// title

Similarly $Q_2$ specifies a query with an OR predicate and $Q_3$ specifies a query with a logical combination of AND and OR predicates.

$Q_2$: /root/course [days="M-W" OR subj="HUM"]//title $Q_3$: /root/course [days="M-W" OR {subj="HUM" OR (instructor="Gill" AND place/building="ELIOT")}]// title Queries similar to $Q_1$, $Q_2$, and $Q_3$ may be designed using constructs provided by a standard query language, such as XQuery. However, embodiments may also process queries involving derived predicates, for example $Q_4$.

$Q_4$: /root/course [days="M-W" OR {subj="HUM" XOR (instructor="Gill" AND place/building="ELIOT")}]// title Of course, while XML trees, such as XML tree 100 shown in FIG. 1, are generally described herein, embodiments may be useful for querying any XML document, XML repository, or any other tree structured data source. The term XML tree is intended to generally cover all tree structured data sources. Additionally, this disclosure generally uses the term "elements" to refer to data-nodes in an XML tree and "nodes" to refer to query-nodes of the twig to be searched.

Figure 2:
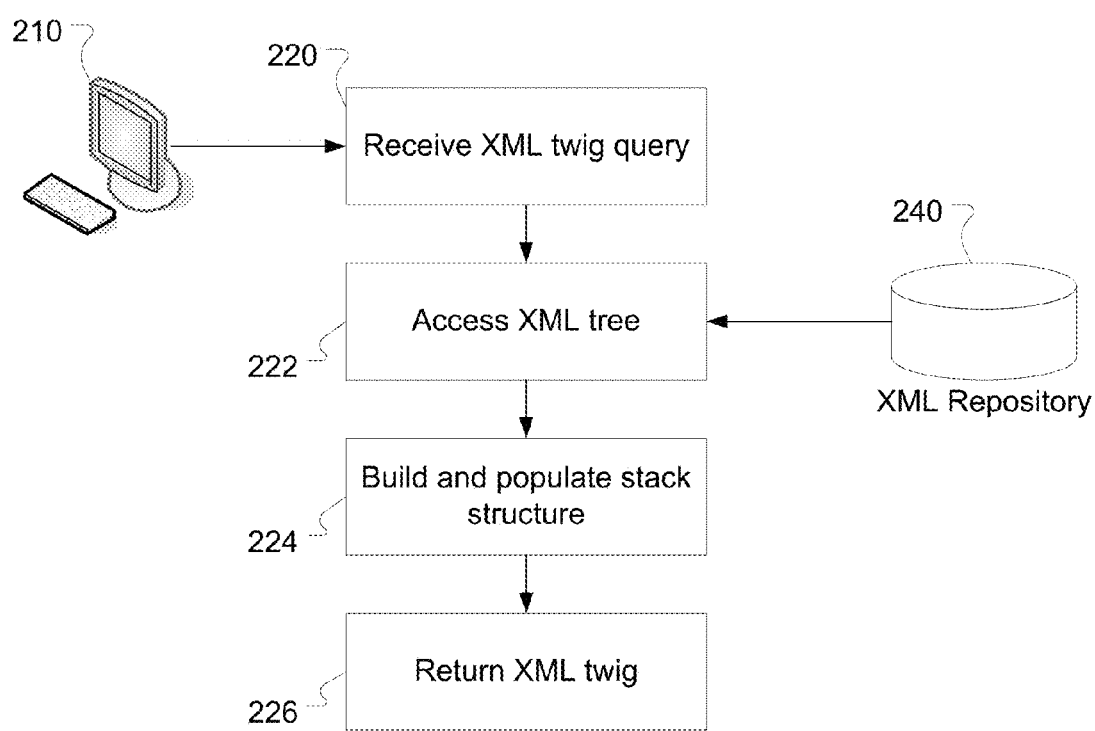
FIG. 2 shows an exemplary process flow for a computer-implemented method of processing queries for XML twigs in an XML tree.

FIG. 2 shows an exemplary process flow 200 for a computer-implemented method of processing queries for XML twigs in an XML tree. At step 220, one or more computing device (e.g., a server computing device, a cluster of server computing devices, a computing device in a distributed environment (i.e., the cloud), etc.) may receive an XML twig query including one or more arbitrary Boolean operators. In other words, at step 220, an XML twig query may be received indicating a tree-shaped structure to be identified in an XML tree. The XML twig query may be received from a computing device 210, for example a computing device operatively coupled to a server computing device over a network (e.g., the internet). For example, the query $Q_4$ shown above may be received. To ease illustration of future steps, $Q_4$ may be rewritten as the equivalent combination of sub-twigs.

$Q_4$=/root/course [$Q_{41}$ OR {$Q_{42}$ XOR ($Q_{43}$ AND $Q_{44}$)}]// title

Where: $Q_{41}$=days/'M-W'; $Q_{42}$=subj/'HUM'; $Q_{43}$=instructor/'Gill'; and $Q_{44}$=place/building/'ELIOT'.

At step 222, one or more computing device may access the XML tree to be queried. For example, the XML tree, such as XML tree 100 shown in FIG. 1, may be accessed from an XML repository 240.

At step 224, a computing device may build and populate a stack structure (i.e., a data structure including one or more last-in-first-out ("LIFO") structures) for identifying one or more XML twigs in the XML tree corresponding to the XML twig query. Note that known steps for hierarchical stack encoding are omitted herein for clarity purposes but may be found, for example, in the incorporated document referring to the Twig²Stack algorithm.

One or more an arbitrary logical entity may be extracted from the XML twig query. For example, in $Q_4$, logical entities may be extracted corresponding to the OR, XOR, and AND operations. Of course, in alternative examples other Boolean operations, including combinations of Boolean operations, may be extracted. One or more logic block ("L-block") may then be inserted into the stack structure corresponding to the one or more arbitrary logical entity.

Figure 3:
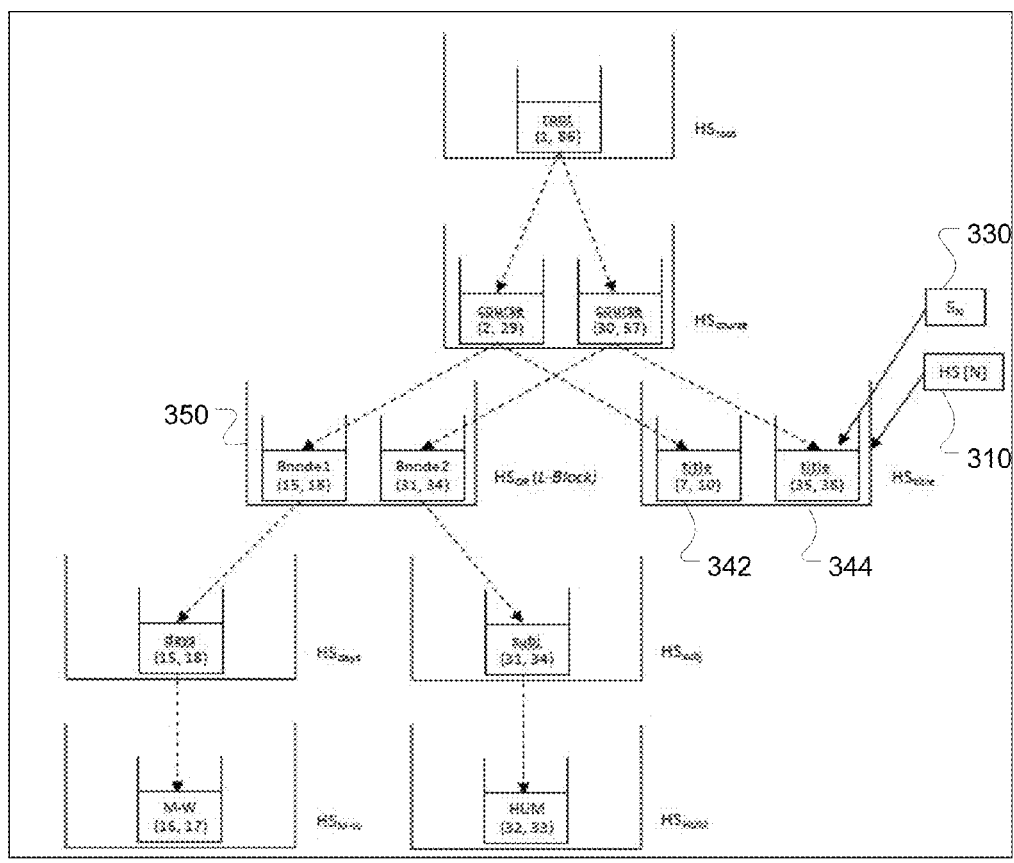
FIG. 3 shows an exemplary portion of a stack structure useful for processing queries for XML twigs in an XML tree.

An L-block may be considered a building block for capturing arbitrary Boolean operations corresponding to logical entities extracted from an XML twig. The L-block may be embedded within the hierarchical encoding scheme such that all structural relationships (i.e., ancestor-descendant ("a-d") and parent-child ("p-c")) between different XML tree elements of various query nodes are maintained while the Boolean logic is satisfied. FIG. 3 illustrates an exemplary portion of a stack structure 300. The following definitions in conjunction with FIG. 3 assist with explanation of an L-block.

A "stack structure" used herein denotes the complete storage structure being used for XML twig query evaluation. A stack structure may consist of multiple hierarchical stack nodes (defined below) organized in the form of a tree. FIG. 3 shows an exemplary portion of a stack structure 300 illustrating $Q_4$.

A "hierarchical stack" or "hierarchical node stack" used herein denotes a stack of stacks. In other words, a hierarchical stack is a node in the stack structure. A hierarchical stack may be represented by HS[n] where n is a query node. Plural hierarchical stacks, including $HS_{title}$ 310, are shown in FIG. 3.

A "stack tree" used herein denotes the nodes within a hierarchical stack organized in the form of one or more trees. Each stack tree may be denoted using the notation STS. For example, FIG. 3 shows STS 342 and STS 344 as separate stack trees within $HS_{title}$ 310 because STS 342 and STS 344 do not have a common parent.

A stack is a node in one of the stack trees of the hierarchical stack, for example stack 330 in stack tree 344. Note that while the example shown in FIG. 3 stack 330 comprises the entire stack tree 344, in alternative examples a stack tree 344 may include plural stacks.

A query, Q, is a combination of one or more sub-queries, $Q_i$, connected logically using one or more Boolean operators, such as AND, OR, and XOR. Each sub-query, $Q_i$, consists of a set of twig nodes, $n \in N_i$, connected using the logical operator and having a structural relationship (i.e., parent-child or ancestor-descendant relationship).

In addition to hierarchical stacks corresponding to elements in an XML tree, at step 226 one or more L-blocks, such as L-block 350, may be inserted in stack structure 300. L-blocks are hierarchical stacks embedded in a query, Q, such that the Boolean expression evaluates to 'True' for an output twig instance of the query, Q, comprising sub-queries $Q_i$, $Q_{i'}$, and $Q_{i''}$. The root queries of $Q_{i'}$ and $Q_{i''}$ may be connected to a node $Q_i$ in the stack structure.

For example, let ⊕ represent an arbitrary Boolean operation. In addition to associating hierarchical stacks, HS[n], each containing zero or more elements that match the query node n, stack structure 300 includes one or more L-block 350 $HS_\oplus[Q_i, Q_{i'}, Q_{i''}]$ with a Boolean operator ⊕ such that the Boolean logic evaluation between sub-queries $Q_{i'}$ and $Q_{i''}$ is rooted at the least common ancestor ("LCA") $Q_i$ of $Q_{i'}$ and $Q_{i''}$. For example the LCA of $Q_{41}$ above is "days" while the LCA of $Q_{41}$ and $Q_{42}$ is "course".

Referring again to step 224 of process flow 200 of FIG. 2, a computing device may populate one or more L-blocks in the stack structure 300. In this step, XML tree elements may populate stack trees in conventional fashion, for example as explained in relation to the Twig²Stack algorithm. However, embodiments may also create stack trees within the L-blocks and populate the same with Boolean elements ("Bnodes" or "Belems"). A Bnode is a data structure configured for evaluating the predicate logic according to an arbitrary Boolean operator. Each Bnode may have a set of Boolean variables, the cardinality of the set depending on the number of predicates in the predicate logic. For example, if the predicate logic is between two sub-queries $Q_{i'}$ and $Q_{i''}$, then the Bnode has two Boolean variables, Bnode.$Q_{i'}$ and Bnode.$Q_{i''}$. Bnode.$Q_{i'}$=1 indicates the presence of a twig that matches the pattern $Q_{i'}$ and Bnode.$Q_{i'}$=0 indicates the absence of the pattern $Q_{i'}$. The following illustrates exemplary pseudo-code for populating logic blocks with Boolean elements. The pseudo-code utilizes the logic: 1) for every element e belonging to $Q_{i'}$ a new Bnode needs to be inserted; 2) for every element e belonging to $Q_{i''}$ either an existing Bnode needs to be pointed to e (for antecedent sequence of 1 followed by 1) or a new Bnode needs to be inserted (for antecedent sequence of 0 followed by 1).

---

PopulateLBlock (docElement n, $HS_\oplus[Q_i,(Q_{i'},Q_{i''})]$)

```
1:  IsEmpty(HS⊕[Qi,(Qi',Qi'')])?-push(new(Bnode),new(S⊕)) && Boolean
    Bnode.start = n.start && Boolean Bnode.end = n.end && Boolean
    Bnode.Qi' = True && addEdge(Bnode, top(Sn)): GoTo Line-2
2:  Boolean findStackflag =0 //Intialize findStackflag to 0
3:  for (each S⊕ in HS⊕[Qi,(Qi',Qi'')])
4:      if (top(S⊕ ).startpos > n.startpos && top(S⊕ ).endpos < n.endpos
    && n∈Qi') then
5:          push (new(Bnode), S⊕)
6:          Boolean Bnode.start = n.start && Boolean Bnode.end = n.end
    && Boolean Bnode.Qi'=True && findStackflag=1 && addEdge(Bnode,
    top(Sn))
7:          Break;
8:      endif
9:  endfor
10: if findStackflag is 0 then
11:     Boolean hasParentflag =0 //Initialize hasParentflag to 0
12:     for (each S⊕ in HS⊕[Qi,(Qi',Qi'')])
13:         if IsParent(top(S⊕ )) is True then
14:             Boolean Bnode.Qi''=True
15:             Bnode.end = n.end
16:             hasParentflag =1
17:             addEdge(Bnode, top(Sn))
18:         endif
19:     endfor
```

| PopulateLBlock (docElement n, $HS_{\oplus}[Q_{i'}(Q_{i'},Q_{i''})]$) |
|---|
| 20:   if hasParentflag is 0 then |
| 21:     push(new(Bnode), new($S_\oplus$)) |
| 22:     Boolean Bnode.start = n.start && Boolean Bnode.end = n.end Boolean Bnode.$Q_{i'}$=True && addEdge(Bnode, top($S_n$)) |
| 23:   endif |
| 24: endif |

The above PopulateLBlock pseudo-code may be executed by a computing device when an element matches the root node, n, in the sub-query, $Q_{i'}$. If the hierarchical node stack $HS_\oplus$ is empty then a new Boolean element (new(Bnode)) may be inserted by creating a new stack (new($S_\oplus$)). Further, an A-D edge may be created between the newly inserted Belem and the stack $S_n$ belonging to HS[n] and Belem.$Q_{i'}$ is set to 'True' [Line 1 above]. However, if the L-Block $HS_\oplus$ is non-empty, then the function may check if there are any existing stacks, $S_\oplus$, in the L-Block where the Bnode can be inserted [Lines 4 and 5 above]. The insertion of the Bnode may be governed by principles similar to the insertion of a document element e in the regular hierarchical stack HS[n]. The region encoding of the Bnode may be set as the region encoding of e. Thus, fulfillment of condition in line 4 implies n belongs to $Q_{i'}$. However, if a suitable stack $S_\oplus$ could not be found, in other words the condition in line 4 could not be satisfied (i.e., findStackflag is 0), then the function may indicate that the document element e belongs to a query node in $Q_{i''}$. In such a case, the function may locate the appropriate stack and, hence, the Bnode which can be made to point to e (top of stack $S_n$ in HS[n]) [Line 13]. If such a stack and Bnode could not found (i.e., hasParentflag is 0), then the function may create a new stack and populate it with a new Bnode [Line 21 above].

Referring again to process flow 200, at step 224 the stack structure may also be populated with XML tree elements. An XML tree element e may be pushed into a root stack, $S_n$, of a stack tree, STS, within the hierarchical node stack HS[n] when it satisfies the sub-twig queries rooted at n. Note that a hierarchical node stack HS[n] may contain multiple STSs; however each STS has only one root stack, $S_n$. Thus, the appropriate root stack and the STS where the element e should be stored needs to be determined. Exemplary pseudo-code below illustrates a function push for determining where an element e should be stored and, if so, an appropriate stack. The function may perform a test between the topmost element of the root stack in each of the STSs and element e [Line 4 below]. In case there exists multiple stack trees that satisfy the encapsulation conditions [Line 9], a computing device may create a new stack for storing the element e [Lines 10-11] and point it to the topmost elements of the root stacks satisfying the encapsulation conditions [Line 14]. This in essence merges these stack-trees into a single stack-tree.

| Procedure push(n, HS[N]) |
|---|
| 1: Integer count =0; |
| 2: For each StackTree, STS in HS[N] do |
| 3:   Let $S_N$ be the root stack in STS |
| 4:   If top($S_N$).startpos>n.startpos && top($S_N$).endpos<n.endpos |
| 5:     Push(n, $S_N$) |
| 6:     count++; |
| 7:   endif |
| 8: endFor |
| 9: if count > 1 |
| 10:   create new $S_N$. |

| Procedure push(n, HS[N]) |
|---|
| 11:   Push (n, $S'_N$) |
| 12:   For each $S_N$ with top($S_N$) = n other than the newly created $S_N$ in line 10-11 do |
| 13:     Delete top($S_N$) |
| 14:     Add edge from n to top($S_N$)   // This step merges few of the existing STS in one STS |
| 15:   endFor |
| 16: endif |
| 17: if count = 0 |
| 18:   create new STS and $S_N$. |
| 19:   Push (n, $S'_N$) |

Figure 4:
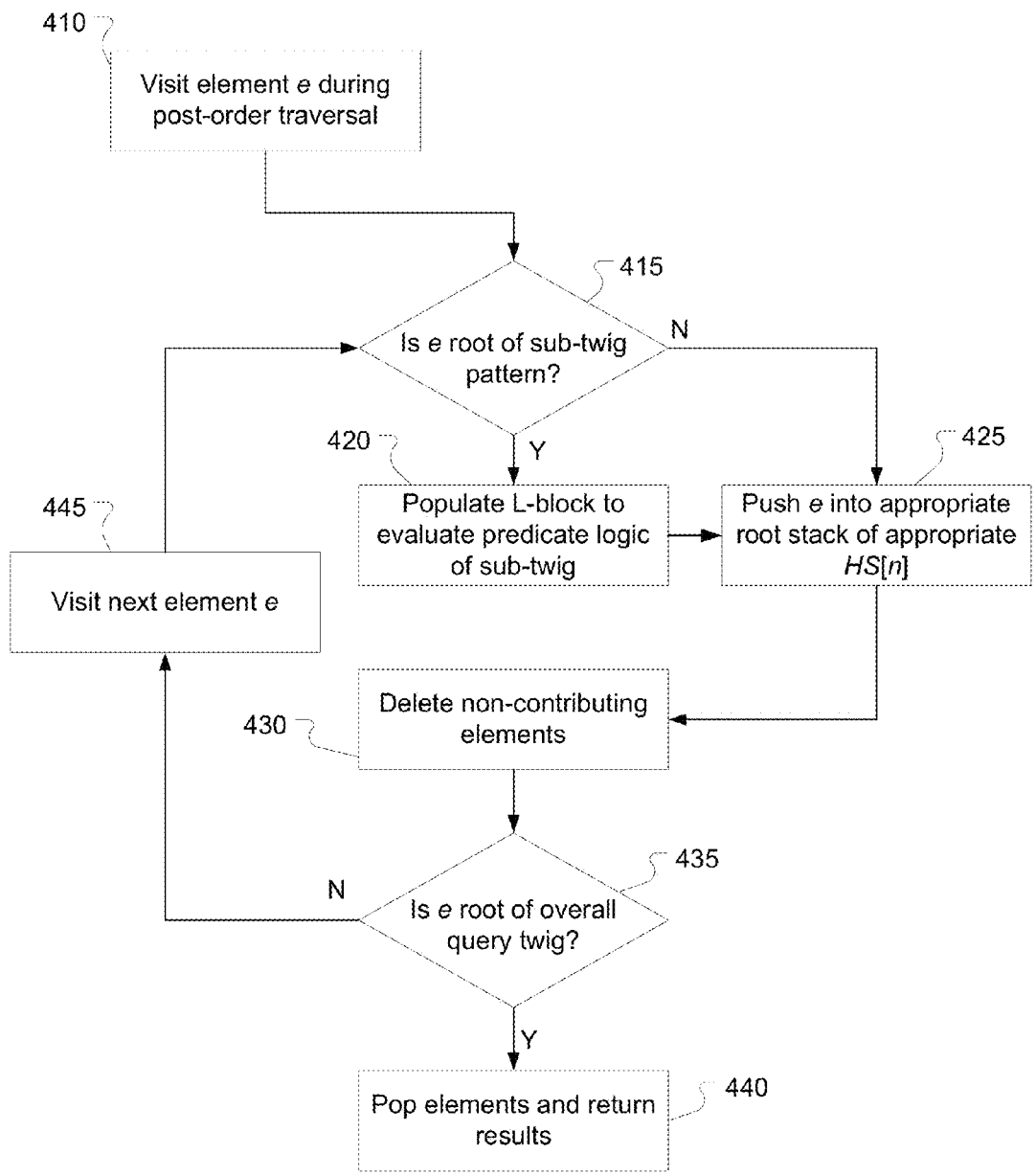
FIG. 4 shows an exemplary process flow for post-order traversal and population of the stack structure.

FIG. 4 illustrates an exemplary process flow 400 for post-order traversal and population of the stack structure. The following exemplary pseudo-code Twig³Stack may perform such a process flow. For every document element e visited during the post-order traversal scheme, a function must determine whether e is a root element of any sub-twig and take appropriate steps. At step 410, a computing device may visit a first element e during post-order traversal. Next, at step 415, a computing device may determine whether e is a root element of any sub-twig [IsRootedAtLBlock (e) in Line 2 below]. At step 420, if e is the root of a sub-twig pattern, then the function PopulateLBlock(e, $HS_\oplus$) may be executed to evaluate the predicate logic and appropriately populate one or more L-blocks with Boolean elements. However, if e is not the root of a sub-twig pattern, or after populating one or more L-blocks with the Boolean elements, at step 425 a computing device may insert e into an appropriate root stack of a regular hierarchical stack. At step 430, a computing device may then execute a function (e.g., DeleteNonContribBnodes [Line 3 below]) to determine elements that do not contribute to the final results or do not satisfy the predicate logic. At this step, elements that do not contribute to the final result may be released (i.e., no longer stored in memory). At step 435, a computing device may determine if the document element e is the root of the overall query [Line 4 below]. If so, at step 440 a computing device may pop the elements from the stacks, enumerate the results, and return the twig results [Line 5]. Alternatively, at step 445 a computing device may advance to the next element e and the process flow 400 may then return to step 415.

| Twig³Stack |
|---|
| 1:   For all docElements n traversed in the post-order manner |
| 2:   For each query node q with matching label of n |
| 3:     IsRootedAtLBlock(n)?-PopulateLBlock(n,HS⊕)&& DeleteNonContribNodes(n):push(n, HS[N]) |
| 4:     if IsQueryRoot(q) is True then |
| 5:       enumerate the results by popping elements from the hierarchical stacks |
| 6:   Endif |
| 7: endFor |

To determine elements that do not contribute to the final twig results, a computing device may evaluate priority of a rule for the particular Boolean logical operator. Tables 1 and 2 below, for example, list four different rules for each of the AND Boolean operation and the XOR Boolean operation, respectively, together with their evaluation priority. A rule may have a high evaluation priority if one of the following two conditions holds: 1) the rule has a truth value of 1, or 2) the rule has a truth value of 0 and has an antecedent comprising a sequence of 0s followed by a sequence of 1s (e.g., shown in rule 2 of Table 1). Of course, other tables may be useful for the OR, NAND, NOR, NXOR, any other Boolean operations, and combinations of Boolean operations.

TABLE 1

Truth Table for AND Operation

| Rule Number | $Q_{i'}$ | $Q_{i''}$ | Truth Value | Evaluation Priority |
|---|---|---|---|---|
| 1 | 1 | 0 | 0 | Low |
| 2 | 0 | 1 | 0 | High |
| 3 | 1 | 1 | 1 | High |
| 4 | 0 | 0 | 0 | Low |

TABLE 2

Truth Table for XOR Operation

| Rule Number | $Q_{i'}$ | $Q_{i''}$ | Truth Value | Evaluation Priority |
|---|---|---|---|---|
| 1 | 1 | 0 | 1 | High |
| 2 | 0 | 1 | 1 | High |
| 3 | 1 | 1 | 0 | Low |
| 4 | 0 | 0 | 0 | Low |

Evaluation priorities determine conditions when an element can be discarded. The following exemplary pseudo-code for a function DeleteNonContriBnodes(e) outlines an exemplary scheme that makes use of these evaluation priorities to decide if a stack tree or an element can be discarded. Note that embodiments may only discard the elements and not discard Bnodes. For example, consider the query $Q_1$ from above with reference to the truth table for the AND operation. When an element e' matching a query node n in $Q_{i'}$, (e.g., e' is instructor and $Q_{i'}$ is/instructor/'Gill') is visited, a Boolean element may be inserted in the L-block. Assuming that this Boolean element does not point to any element belonging to $Q_{i''}$, where $Q_{i''}$ is /subj/'HUM', the newly inserted Bnode may be checked against rule 1 in Table 1 by a computing device, for example by executing the function DetermineRuleMatch. DetermineRuleMatch [line 1 below] may determine the rule of the truth table against which a Bnode should be evaluated. Since rule 1 of Table 1 has a low priority, no decision on discarding the element e' can be made at this stage. This corresponds to lines 2 and 3 in DeleteNonContriBnode. Subsequently, when an element e", where e" is subj, belonging to is encountered and this Boolean element is made to point to e", then the Boolean element matches rule 3 of Table 1. Since, rule 3 is a high priority rule and the truth value is 1, both elements e' and e" may to be retained.

Procedure DeleteNonContriBnodes(e)

1:  RulePriority = DetermineRuleMatch(BooleanParent(e), TruthTable)
2:  If RulePriority is high then
3:      Retain the element e //do-not delete it
4:  Elseif RulePriority is low && a higher priority rule for
    BooleanParent(e) has been checked before
5:      Delete the stack-tree
6:  endif Similarly, Table 2 above shows the truth table for the XOR operation. Consider query $Q_4$. In this context, when an element e matches a query node in $Q_{1'}$, a Boolean element may be inserted in the L-block and the operation BooleanParent(e) may return this Boolean element. Assuming that this Boolean element does not point to any element belonging to $Q_{i''}$, this element may be checked against rule 1 of Table 2. Since rule 1 has a high priority in Table 2, element e may be retained. Subsequently, when an element e" belonging to $Q_{i''}$ is encountered and this Boolean element is made to point to e", then the Boolean element matches rule 3 of Table 2. Since, rule 3 is a low priority rule and a high priority rule for the Boolean element has already been checked earlier, a computing device can discard elements e and e" [Lines 4-5 above]. However, the Boolean elements not discarded as new elements matching a query node in $Q_{i''}$ can still be encountered. It can be seen that checking a Bnode against a rule automatically implies checking of the elements pointed to by the Bnode against the rule. For a query Q with |Q| distinct query-nodes and B Boolean operations and XML document D, the worst case space-complexity of embodiments is $O(|D|(|Q|+|B|))$. The worst case time-complexity of the modified scheme is $O(|D||Q|)$.

Conventional bottom-up approaches, such as Twig$^2$Stack, can only evaluate predicate logic between sub-twig matching elements when a least common ancestor element is visited. Thus, conventional approaches are memory intensive because they must retain elements satisfying a sub-twig until a match for the least common ancestor of the sub-twigs is encountered in the data tree. Embodiments disclosed herein may discard (e.g., delete) non-contributing elements as soon as a root element is encountered without waiting for a least common ancestor.

For example, conventional methods could process $Q_4$ discussed above by transforming the XOR predicate into an equivalent query with AND, OR, and NOT predicates as shown below.

$Q_4$=/root/course [$Q_{41}$ OR {$Q_{42}$ OR ($Q_{43}$ AND $Q_{44}$)}]
[NOT {$Q_{42}$ AND ($Q_{43}$ AND $Q_{44}$)}]//title Where: $Q_{41}$=days/'M-W'; $Q_{42}$=subj/'HUM'; $Q_{43}$= instructor/'Gill'; and $Q_{44}$=place/building/'ELIOT'. Using the Twig$^2$Stack algorithm to execute the twig query $Q_4$ against the XML tree 100 of FIG. 1, elements subj (31, 34) 130 and 'HUM' (32, 33) 140 satisfy the sub-twig subj/HUM and the elements instructor (39, 42) 132 and 'Gill' (40, 41) 142 satisfy the sub-twig instructor/Gill until the least common ancestor element course (30, 57) 120. It is only once the least common ancestor element course (30, 57) 120 is encountered that a decision can be made as part of an edge test and axis check. In other words, all elements satisfying sub-twigs of the query twig must be retained until the least common ancestor of all elements is visited to determine if the combined sub-twigs satisfy the query twig. In the case of executing $Q_4$ against XML tree 100, elements subj (31, 34) 130, 'HUM' (32, 33) 140, instructor (39, 43) 132, 'Gill' (40, 41) 142, place (47, 55) 134, bldg (48, 51) 144, and 'ELIOT' (49, 50) 146 must be retained until course (30, 57) 120 is visited. Finally, once course (30, 57) 120 is visited a conventional methods could determine that $Q_4$ is not satisfied and, thus, discard the stored elements from memory.

In contrast, embodiments disclosed herein allow for discarding stored elements as soon as the root element of a sub-twig is visited. For example, in the case of $Q_4$, elements subj (31, 34) 130 and 'HUM' (32, 33) 140 may first be stored because they match query node $Q_{42}$. A Boolean element (e.g., Bnode.$Q_{42}$) may then be inserted in the L-block and the element may be checked against rule 1 of the truth table for the XOR operation. Since rule 1 has a high priority, the elements may be retained.

Next, elements instructor (39, 43) 132 and 'Gill' (40, 41) 142 may be stored because they match query node $Q_{43}$. A Boolean element (e.g., Bnode.$Q_{43}$) may be inserted in the L-block and the element may be checked against rule 1 of the truth table for the AND operation. Because rule 1 has a low priority, no determination regarding discarding the element can be made at this stage and the elements may be retained.

The process may continue to store elements 'ELIOT' (49, 50) 146, bldg (48, 51) 144, and place (47, 55) 134 because they satisfy $Q_{44}$. A Boolean element (e.g., Bnode.$Q_{44}$) may be inserted in the L-block. At this point, a computing device may determine the predicate logic of Bnode.$Q_{43}$ AND Bnode.$Q_{44}$. The Bnode elements may then be checked against rule 3 of the truth table for the AND operation. As shown above, the truth value for rule 3 is 1 (i.e., true) and the evaluation priority is high, thus elements corresponding to query nodes (i.e., sub-twigs) $Q_{43}$ and $Q_{44}$ may be retained.

At this point, a computing device may also determine the predicate logic of Bnode.$Q_{42}$ XOR (Bnode.$Q_{43}$ AND Bnode.$Q_{44}$) (i.e., Bnode.$Q_{42}$ XOR 1 because Bnode.$Q_{43}$ AND Bnode.$Q_{44}$ have a truth value of 1 in this case as described above). The Bnode elements may then be checked against rule 3 of the truth table for the XOR operation. Because rule 3 is a low priority rule and a higher priority rule for the Boolean element has already been checked earlier, the elements may be discarded (e.g., deleted from memory, thus freeing up memory). Note, however, that the Boolean elements (i.e., Bnodes) may be retained (i.e., not discarded) as new elements matching a query node may still be encountered.

Alternative embodiments may include a single truth table for query $Q_4$ having a cardinality corresponding to the number of elements involved in the truth table. Such embodiments may implement similar rules in the truth table such that a rule has a high priority if one of the following conditions holds: the rule has a truth value of 1, or 2) the rule has a truth value of 0 and has an antecedent comprising a sequence of 0s followed by a sequence of 1s. Still other embodiments may have other numbers of truth tables for any number of combined Boolean operations.

In summary, disclosed embodiments may allow for discarding elements that will not contribute to the final results or do not satisfy the predicate logic as soon as a root of a sub-twig is reached. This may provide significant memory savings over even "holistic" bottom-up XML twig processing techniques, such as Twig$^2$Stack.

Figures 5A, 5B:
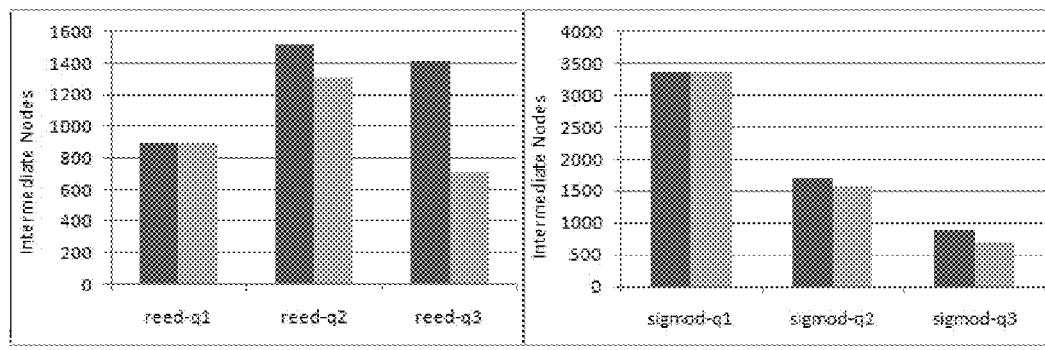
FIGS. 5, 6, and 7, illustrate test results showing reduced storage requirements for queries implementing embodiments disclosed herein in comparison to queries using a conventional technique.
Figure 5C:
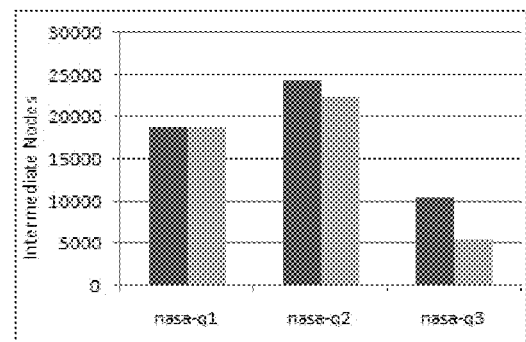

To further illuminate the increased memory efficiencies of embodiments disclosed herein, FIGS. 5, 6, and 7, illustrate the number of intermediate elements stored for a set of test queries using both the Twig$^2$Stack technique (the lighter shaded bars) and the technique of embodiments disclosed herein (the darker shaded bars). The testing was conducted using the Reed, Sigmond-Record, and Nasa standard datasets from the University of Washington XML Repository 5. FIGS. 5A, 5B, and 5C illustrate the number of intermediate elements generated on the Reed, Sigmond, and Nasa data sets respectively for plural queries. Query q1 for each of the datasets includes either and AND operator or no Boolean logical operator, query q2 for each of the datasets includes an OR logical operator, and query q3 for each of the datasets includes an XOR logical operator. As can be seen, embodiments store a significantly lower number of intermediate elements than the Twig$^2$Stack technique, thus reducing memory consumption.

Figures 6A, 6B:
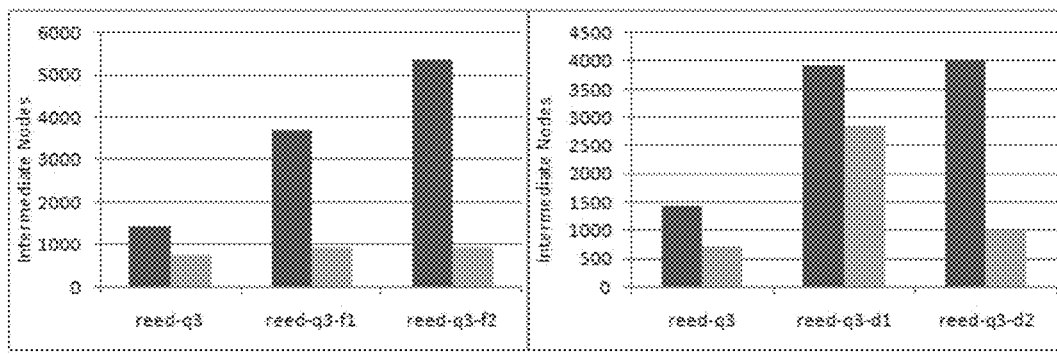
Figures 7A, 7B:
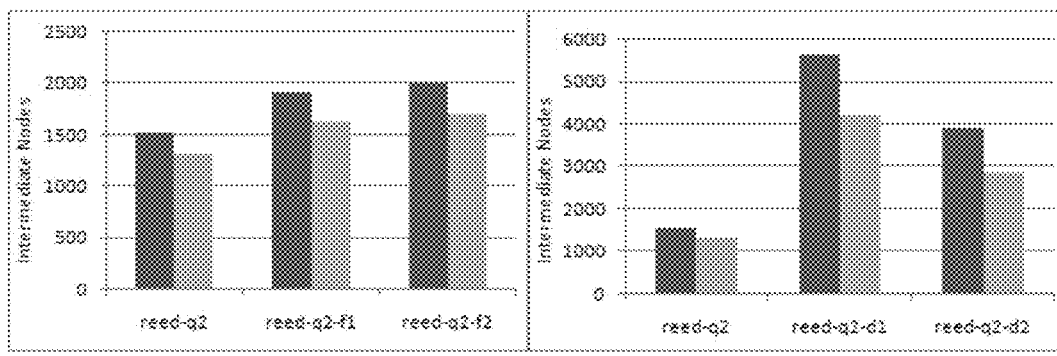

FIGS. 6A and 6B illustrate the intermediate elements generated on the Reed dataset with increasing fan-out and depth for XOR XML queries. FIGS. 7A and 7B illustrate the intermediate elements generated on the Reed dataset with increasing fan-out and depth for OR XML queries. As used herein, fan-out means the number of sub-twigs that are connected by the predicate logic and depth means the distance of a leaf query node in a sub-twig from the logic expression. As can be seen from FIGS. 6 and 7, the difference between the number of intermediate elements generated by the Twig$^2$Stack technique and embodiments disclosed herein is significantly high as the fan-out of the queries and depth increases.

Further details with regard to FIGS. 5, 6, and 7 may be found in the paper "A Memory Efficient Bottom-up Query Processing Scheme for XML Twigs with 'Arbitrary' Boolean-Predicates" by Sumit Kumar Bose and Rashi Malviya published in affiliation with the British National Conference on Databases ("BNCOD") 2010, the entire contents of which are incorporated herein by reference.

Figure 8:
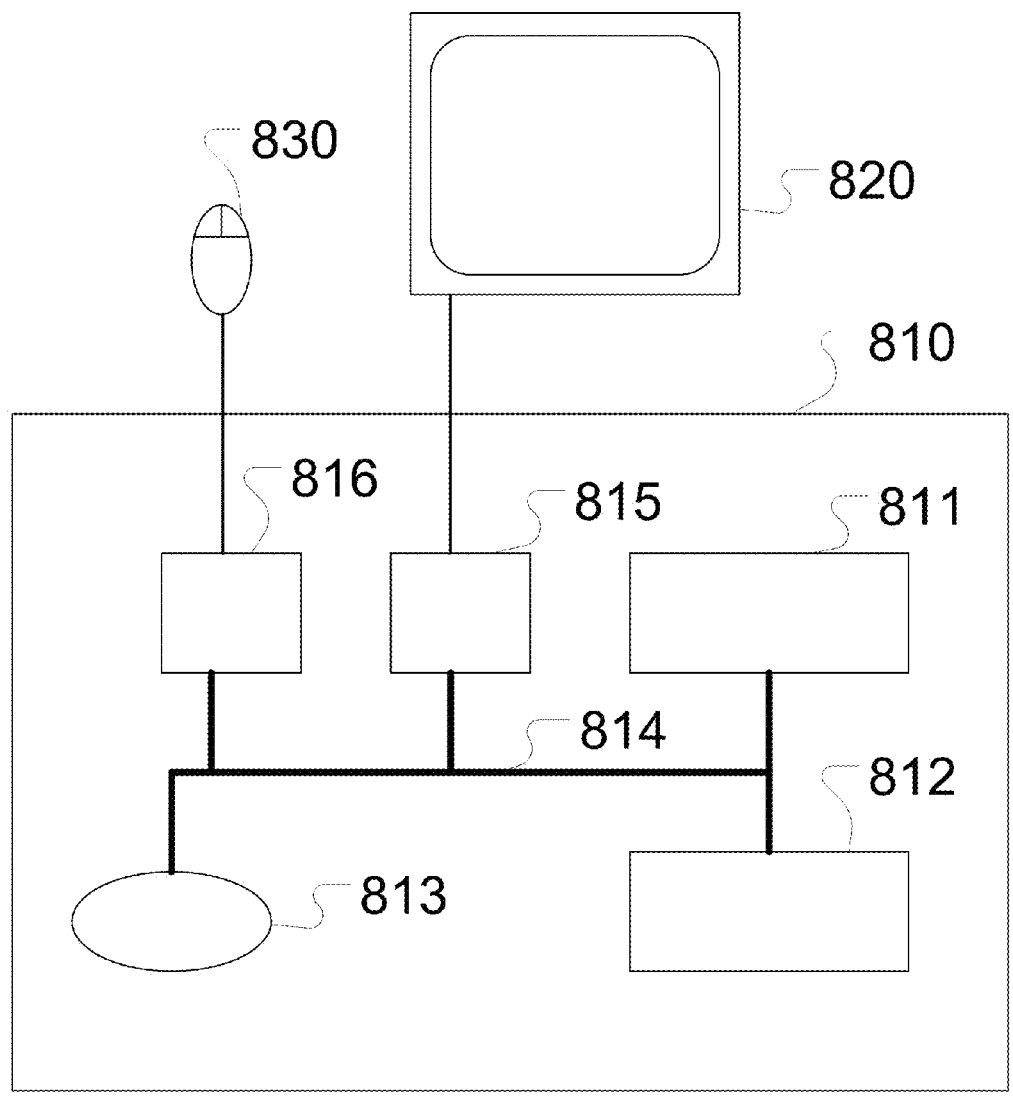
FIG. 8 shows an exemplary computing device useful for performing processes disclosed herein.

Disclosed embodiments may be implemented with software, for example modules executed on computing devices such as computing device 810 of FIG. 8. Of course, modules described herein illustrate various functionalities and do not limit the structure of any embodiments. Rather the functionality of various modules may be divided differently and performed by more or fewer modules according to various design considerations.

Computing device 810 has one or more processing device 811 designed to process instructions, for example computer readable instructions (i.e., code) stored on one or more storage device 813. By processing instructions, processing device 811 may perform the steps and functions disclosed herein. Storage device 813 may be any type of storage device (e.g., an optical storage device, a magnetic storage device, a solid state storage device, etc.) or a combination of storage devices, for example a non-transitory storage device. Alternatively, instructions may be stored in remote storage devices, for example storage devices accessed over a network or the internet. Computing device 810 additionally has memory 812, an input controller 816, and an output controller 815. A bus 814 operatively couples components of computing device 810, including processor 811, memory 812, storage device 813, input controller 816, output controller 815, and any other devices (e.g., network controllers, sound controllers, etc.). Output controller 815 may be operatively coupled (e.g., via a wired or wireless connection) to a display device 820 (e.g., a monitor, television, mobile device screen, touch-display, etc.) in such a fashion that output controller 815 can transform the display on display device 820 (e.g., in response to modules executed). Input controller 816 may be operatively coupled (e.g., via a wired or wireless connection) to input device 830 (e.g., mouse, keyboard, touch-pad, scroll-ball, touch-display, etc.) in such a fashion that input can be received from a user.

Of course, FIG. 8 illustrates computing device 810, display device 820, and input device 830 as separate devices for ease of identification only. Computing device 810, display device 820, and input device 830 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 810 may be one or more servers, for example a farm of networked servers, a clustered server environment, or a cloud network of computing devices.

Embodiments have been disclosed herein. However, various modifications can be made without departing from the scope of the embodiments as defined by the appended claims and legal equivalents.

What is claimed is:

1. A computer-implemented method for processing queries for XML twigs using bottom-up processing, the method comprising:
   receiving, by a computing device, a plurality of query XML twigs, each query XML twig including at least one sub-twig, each sub-twig including at least one element;
   evaluating at least one time an arbitrary Boolean operation in the at least one sub-twig, evaluating at least one other time a different arbitrary Boolean operation in the at least one sub-twig, the arbitrary Boolean operation including at least once a primary Boolean predicate and at least one other time a derived Boolean predicate;
   determining that at least one element in an XML tree is a root element of at least one sub-twig of the plurality of query XML twigs;
   in response to determining that at least one element in the XML tree is a root element, populating a logic block, the logic block comprising one or more stack trees including at least one Boolean element, the Boolean element being a data structure configured for evaluating the predicate logic of the arbitrary Boolean operator, the logic block being configured to maintain existing structural relationships between different XML tree elements of various queries while the arbitrary Boolean operation is satisfied;
   inserting the element into an appropriate stack of a hierarchical stack;
   evaluating that at least one element contributes to finding results of the query;
   discarding at least one element that does not contribute to finding results of the query;
   determining that at least one element is the root of the query XML twig; and
   in response to determining that at least one element is the root of the query XML twig, dissociating the logic block for evaluating the predicate logic of the arbitrary Boolean operator from a stack used to store the elements and return twig results.

2. The method of claim 1, further comprising:
   accessing the XML tree;
   building a stack structure configured for identifying the query XML twig in the XML tree, the stack structure comprising the logic block.

3. The method of claim 1, wherein a region encoding of the Boolean element is set as a region encoding of the element.

4. The method of claim 1, wherein the Boolean element stores logic that incorporates the element but does not store the element.

5. A system for processing queries for XML twigs using bottom-up processing, the system comprising:
   a memory; and
   a processor operatively coupled to the memory, the processor configured to perform the steps of:
   receiving a plurality of query XML twigs, each query XML twig including at least one sub-twig, each sub-twig including at least one element;
   evaluating at least one time an arbitrary Boolean operation in the at least one sub-twig, evaluating at least one other time a different arbitrary Boolean operation in the at least one sub-twig, the arbitrary Boolean operation including at least once a primary Boolean predicate and at least one other time a derived Boolean predicate;
   determining that at least one element in an XML tree is a root element of at least one sub-twig of the plurality of query XML twigs;
   in response to determining that at least one element in the XML tree is a root element, populating a logic block, the logic block comprising one or more stack trees including at least one Boolean element, the Boolean element being a data structure configured for evaluating the predicate logic of the arbitrary Boolean operator, the logic block being configured to maintain existing structural relationships between different XML tree elements of various queries while the arbitrary Boolean operation is satisfied;
   inserting the element into an appropriate stack of a hierarchical stack;
   evaluating that at least one element contributes to finding results of the query;
   discarding at least one element that does not contribute to finding results of the query;
   determining that at least one element is the root of the query XML twig; and
   in response to determining that at least one element is the root of the query XML twig, dissociating the logic block for evaluating the predicate logic of the arbitrary Boolean operator from a stack used to store the elements and return twig results.

6. The system of claim 5, wherein the processor is further configured to perform the steps of:
   accessing the XML tree;
   building a stack structure configured for identifying the query XML twig in the XML tree, the stack structure comprising the logic block.

7. The system of claim 5, wherein a region encoding of the Boolean element is set as a region encoding of the element.

8. The system of claim 7, wherein the Boolean element stores logic that incorporates the element but does not store the element.

9. Computer-readable code stored on a non-transitory computer-readable medium that, when executed by a computing device, performs the method:
   receiving, by the computing device, a plurality of query XML twigs, each query XML twig including at least one sub-twig, each sub-twig including at least one element;
   evaluating at least one time an arbitrary Boolean operation in the at least one sub-twig, evaluating at least one other time a different arbitrary Boolean operation in the at least one sub-twig, the arbitrary Boolean operation including at least once a primary Boolean predicate and at least one other time a derived Boolean predicate;
   determining that at least one element in an XML tree is a root element of at least one sub-twig of the plurality of query XML twigs;
   in response to determining that at least one element in the XML tree is a root element, populating a logic block, the logic block comprising one or more stack trees including at least one Boolean element, the Boolean element being a data structure configured for evaluating the predicate logic of the arbitrary Boolean operator, the logic block being configured to maintain existing structural relationships between different XML tree elements of various queries while the arbitrary Boolean operation is satisfied;
   inserting the element into an appropriate stack of a hierarchical stack;
   evaluating that at least one element contributes to finding results of the query;
   discarding at least one element that does not contribute to finding results of the query;
   determining that at least one element is the root of the query XML twig; and in response to determining that at least one element is the root of the query XML twig, dissociating the logic block for evaluating the predicate logic of the arbitrary Boolean operator from a stack used to store the elements and return twig results.

10. The computer-readable code of claim 9, the method further comprising:
    accessing the XML tree;
    building a stack structure configured for identifying the query XML twig in the XML tree, the stack structure comprising the logic block.

11. The computer-readable code of claim 9,
    wherein a region encoding of the Boolean element is set as a region encoding of the element, and
    wherein the Boolean element stores logic that incorporates the element but does not store the element.

* * * * *